April 13, 1965
A. F. OATLEY
3,178,558
GRILLING APPLIANCES
Filed July 13, 1962
4 Sheets-Sheet 1
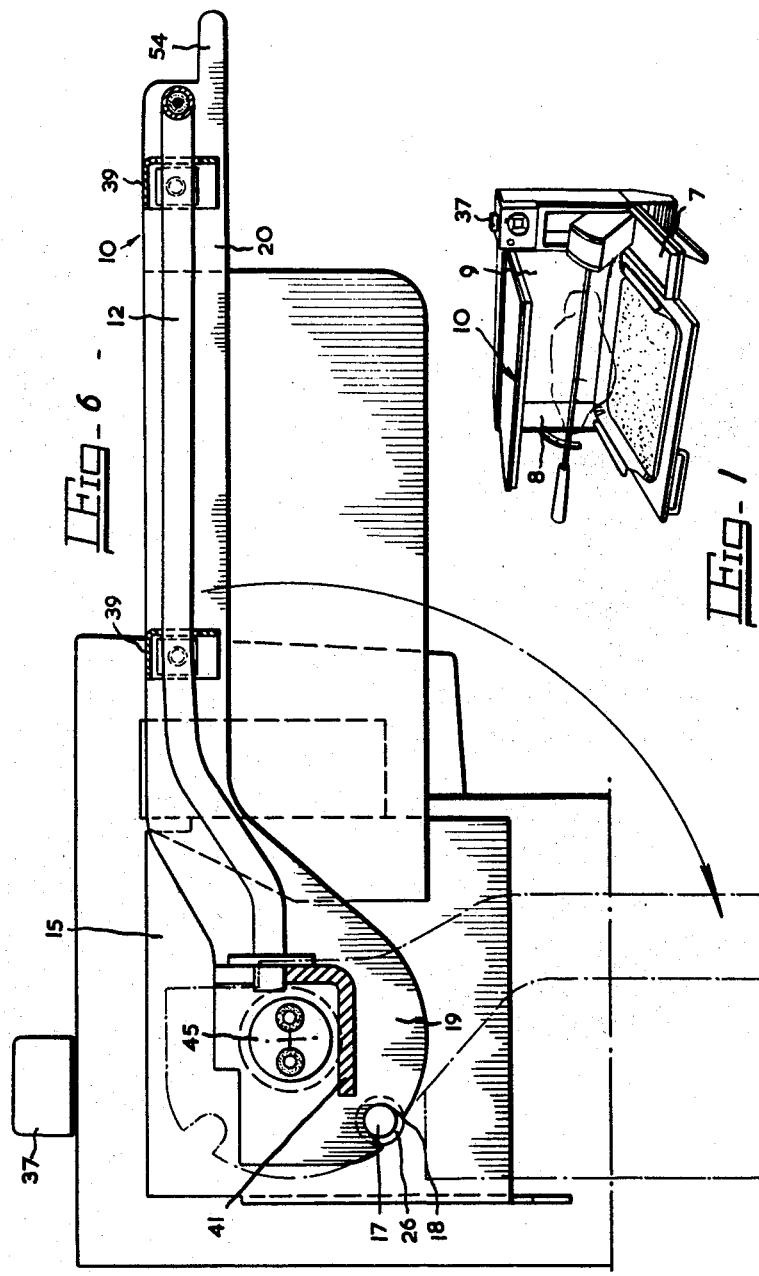

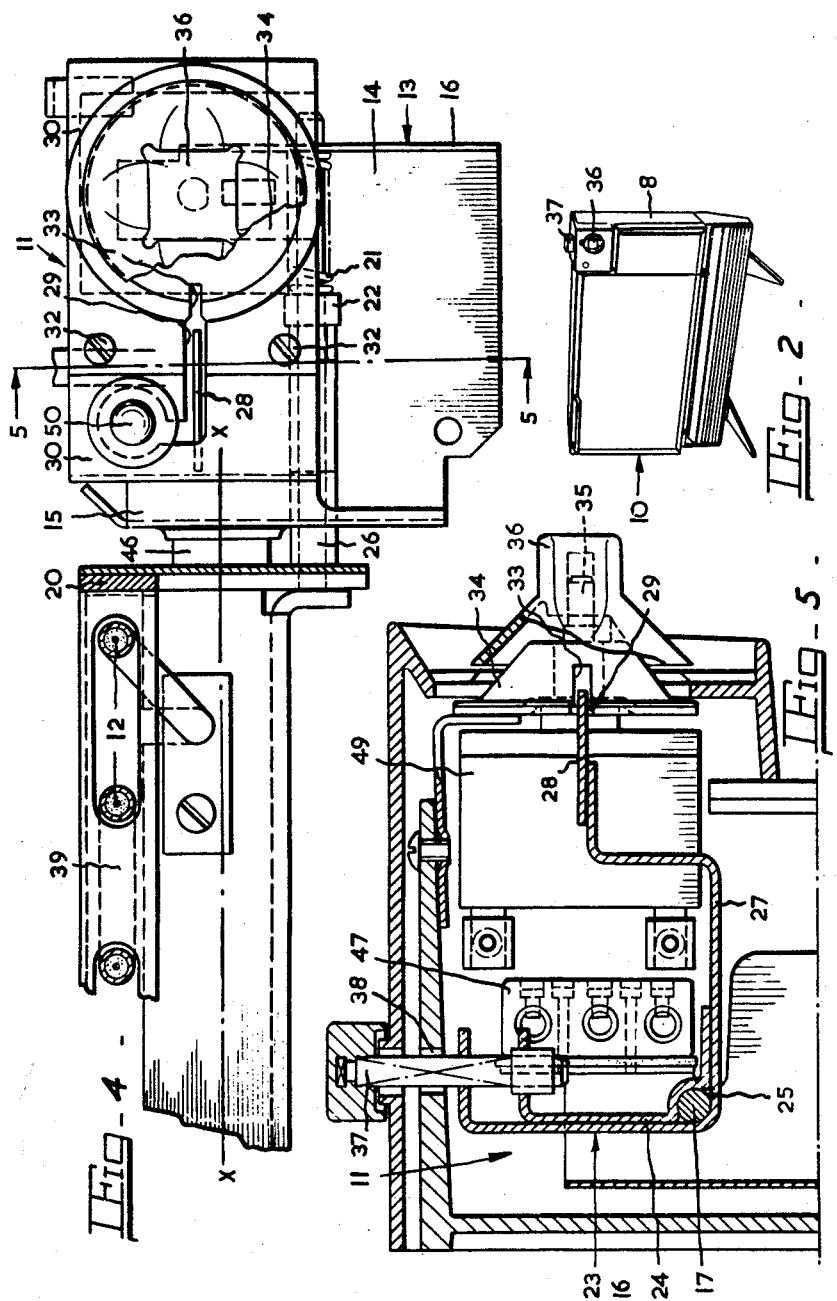

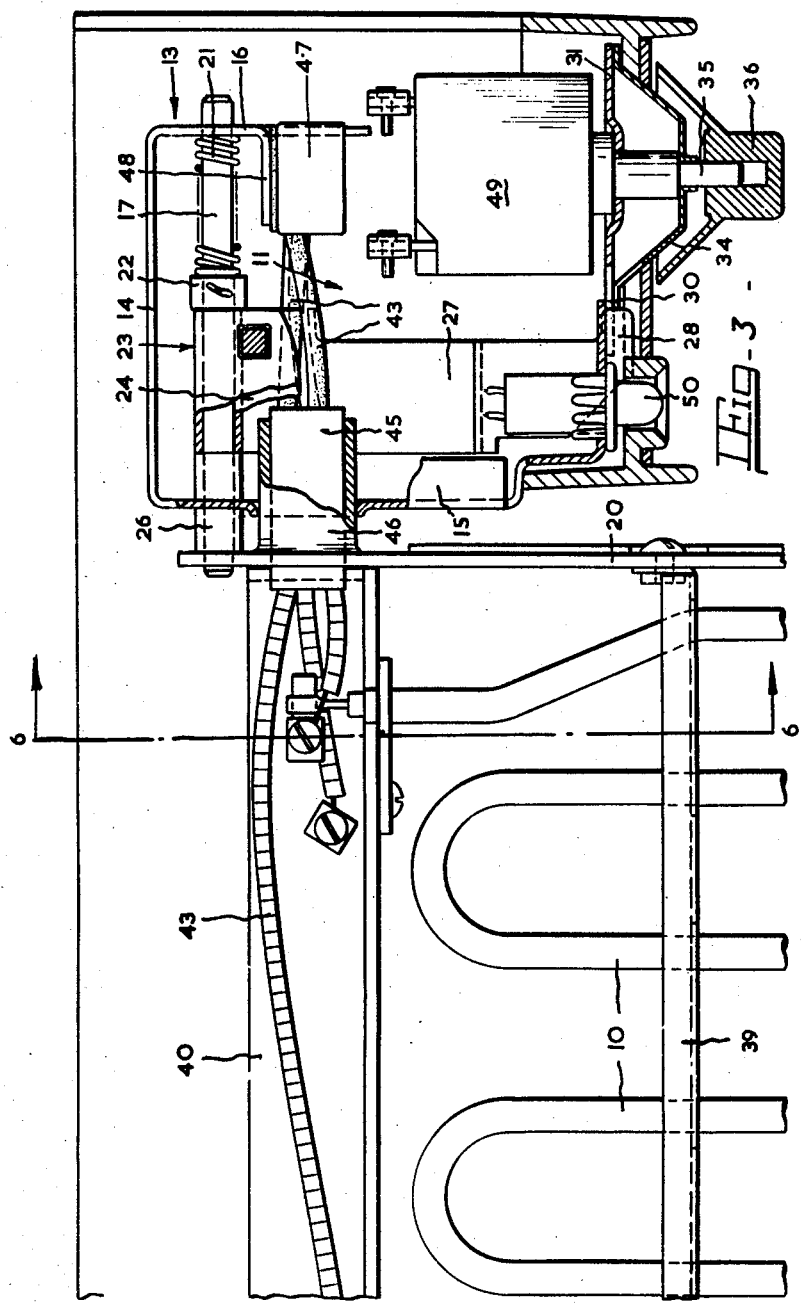

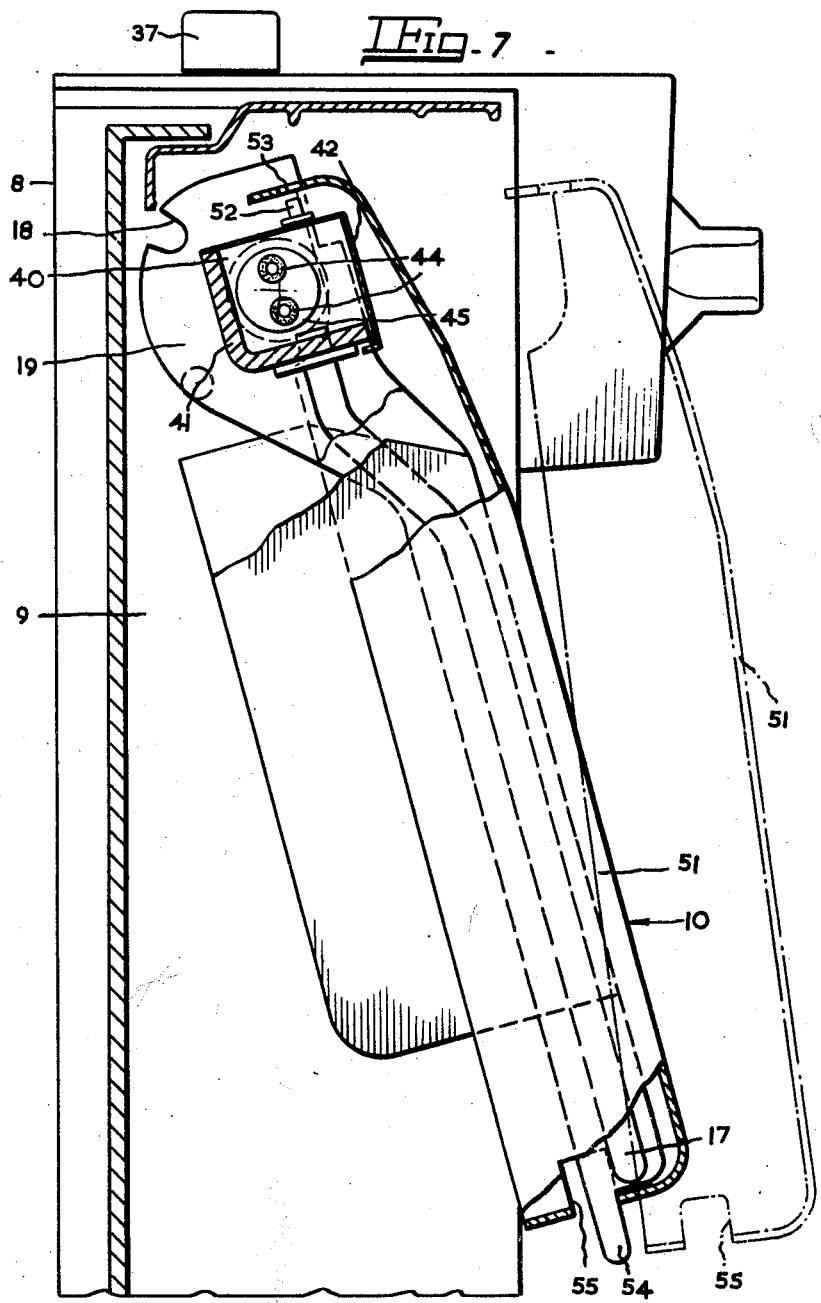

United States Patent Office 3,178,558
Patented Apr. 13, 1965

3,178,558
GRILLING APPLIANCES
Arthur Frederick Oatley, Wilton Lodge, Wergs Road,
Tettenhall, Wolverhampton, England
Filed July 13, 1962, Ser. No. 209,587
Claims priority, application Great Britain, July 14, 1961,
25,521/61
4 Claims. (Cl. 219—461)

This invention relates to electrically heated grilling appliances in which the radiant surface is pivotally mounted on a supporting structure for angular movement about an axis between a substantially horizontal position of use and a vertical stored position in or against the supporting structure.

According to the present invention a bolt which is slidably mounted in or on the supporting structure is engageable, when the radiant surface is in the horizontal position of use, with an opening or recess in a part movable with the radiant surface, the bolt being provided with a detent which, as the bolt is withdrawn, is engaged in a notch or aperture in a locking member rigid with the spindle of a rotary switch controlling the supply to the heating element of the grilling appliance provided that the switch is in the off position, the arrangement being such that when the switch is in other than the off position the bolt is prevented from being withdrawn by the engagement of the detent with the locking member and when the radiant surface is in other than the position of use the bolt is prevented by the said part from sliding movement sufficient to withdraw the detent from the notch or aperture locking the switch in the off position.

A cover is fitted over the top of the radiant surface and in order that it and the heating element can be cleaned or the element changed it is made removable, but it is so arranged that it can only be removed when the radiant surface is not in the horizontal in-use position and therefore the switch locked in the off position.

An embodiment of the invention will now be described by way of example with reference to the accompanying drawings in which, FIGURE 1 is a perspective view of the front of an electrically heated grilling appliance according to the present invention, shown in the in-use position.

FIGURE 2 is a perspective view of the grilling appliance in the inoperative position.

FIGURE 3 is a plan view partly in section of an interlocking mechanism provided in the appliance, the appliance being in the operative position.

FIGURE 4 is a front view of the interlocking mechanism.

FIGURE 5 is a section on the line 5—5 of FIGURE 4.

FIGURE 6 is a section on line 6—6 of FIGURE 3.

FIGURE 7 is a section similar to that shown in FIGURE 6 but with the radiant surface only partly in section and in a position suitable for removing a cover provided over the radiant surface.

The grilling appliance in this embodiment, as shown in FIGURES 1 and 2, has a supporting structure 8 in the form of a sheet metal casing which includes a recess 9 in which a radiant surface 10 is pivotally mounted about a horizontal axis X—X, FIGURE 6, for movement between a horizontal position of use and a vertical stored position in which the radiant surface 10 is received within the recess 9. The pivotal axis X—X extends parallel and close to one end of the radiant surface so that when the radiant surface is in the in-use position it extends substantially at right angles to the upper end of the supporting structure 8, as shown in FIGURE 1, and is downwardly directed. To move the radiant surface from the stored position to the horizontal in-use position the lower end is swung outwards and upwards until the radiant surface is horizontal. Interlocking means 11 is provided to retain the radiant surface 10 in the horizontal position of use and also to ensure that the supply to a heating element 12 included in the radiant surface can only be turned "on" when the radiant surface is in that position.

The interlocking means 11 is mounted in a sheet metal chassis 13 having a rear wall 14 and parallel side walls 15 and 16, FIGURE 3, and is included in the supporting structure at one side of the radiant surface and adjacent that end of the radiant surface about which it is pivotally movable. A bolt 17 is slidably mounted in the chassis in a direction parallel to and rearwards of the pivotal axis X—X of the radiant surface, the ends of the bolt 17 passing through aligned holes in the side walls 15 and 16 of the chassis. The end of the bolt 17 adjacent the radiant surface, when the radiant surface is in the position of use, is urged by spring force into engagement with a recess 18 in the periphery of a quadrant-shaped end portion 19 of an adjacent side member 20 of the radiant surface 10, as shown more clearly in FIGURES 3 and 6. The spring force is provided by a helical compression spring 21 fitted around the bolt which bears at one end against the side wall 16 of the chassis 13 remote from the radiant surface and at the other against a collar 22 secured on the bolt. Mounted on and movable with the bolt is a member 23 of substantially L-shape which is made of sheet metal. Inside the angle of the L a bracket 24 is secured which has a portion so shaped that, together with the angle of the L-shaped member 23 forms a tubular sleeve 25 through which the bolt passes. Movement of the L-shaped member 23 independent of the bolt is prevented by the collar 22 on one side and a tubular member 26 on the other side which is fitted around the bolt. The tubular member 26 extends almost to the end of the bolt and when the bolt is engaged in the recess 18 in the side member 20 of the radiant surface its end face provides a stop to limit the axial movement of the bolt in the recess.

One of the limbs of the L-shaped member 23 is longer than the other and this forms an arm 27 which extends horizontally forwards from the bolt at right angles to its longitudinal axis and is fitted at its end with a case-hardened detent 28. The detent 28 extends through a horizontal slot 29 formed in a front wall 30 of the chassis. The front wall 30 is formed partly by the side wall 15 which is extended forwards beyond the other side wall 16 and then bent inwards at right angles and partly by a plate 31 which is secured to the inwardly bent portion of the side wall 15 by screws 32. When the bolt is withdrawn from engagement with the recess 18 the L-shaped member is caused to move axially away from the radiant surface and the detent 28 engages a notch 33 in the periphery of a rimmed frusto-conical pressing which constitutes a locking member 34 rigid with a spindle 35 of a rotary switch actuating knob 36 controlling the supply to the heating element 12, provided that the knob 36 is in the "off" position. Only when the knob 36 is in the "off" position and the detent 28 and notch 33 are in alignment, as shown in FIGURE 4, can the bolt be withdrawn from the recess 18 in the side member and the radiant surface moved to the stored position. When not in alignment, the detent is prevented from movement sufficient to disengage the bolt from the recess 18 by the edge of the locking member 24. Until the radiant surface is in the "in-use" position again the quadrant-shaped portion 19 of the side member obstructs the bolt and prevents it from sliding movement sufficient to withdraw the detent from the notch 33.

The bolt is moved out of engagement with the recess 18 by lateral movement of a T-shaped thumb lever 37 connected to the L-shaped member 23. The stem of the thumb lever 37 is upright and of square cross-section and it is keyed to the shorter limb of the L-shaped member which extends vertically upwards, and to the bracket 24 as shown in FIGURE 5. The stem of the T-shaped thumb lever 37 passes through a slot 38 in the top wall of the supporting structure 8 to the L-shaped member.

The heating element 12 is of the tubular sheath radiant type and is looped from back to front across the radiant surface and supported at the front and in an intermediate position by cross members 39 secured at their ends to the side member 18 and a similar side member on the opposite side of the radiant surface. The ends of the heating element enter a square cross-section conduit 40 which extends along the back of the radiant surface, that is when the radiant surface is in the "in-use" position. This conduit 40 is formed by an angle-section member 41, FIGURE 7, which forms the rear frame member of the radiant surface and a sheet metal strip 42 bent at right angles and secured at its edges to the free ends of the arms of the angle-section member 41. Cables 43 to the ends of the heating element extend through the conduit 40 and through holes 44 in a porcelain sleeve 45 in the bore of a tubular trunnion 46. The trunnion 46 forms the pivotal connection between the radiant surface and the supporting structure on the side adjacent the interlocking mechanism. It is secured to the side member 20 of the radiant surface and journalled for pivotal movement in the adjacent side wall 15 of the chassis. The pivotal connection between the supporting structure and the other side of the radiant surface is provided by a trunnion or hinge pin, not shown, secured on the supporting structure which takes a bearing in the adjacent side member and directly opposite the tubular trunnion 46. The supply cables 43 extend into the chassis and are connected to the electricity supply at a porcelain electrical connector block 47 mounted on an inwardly directed bracket portion 48 of the side wall 16 of the chassis. Before reaching the connector block 47 the supply passes through a thermally-operated intermittent on-off switch 48 which is controlled by the knob 36. The on-off switch 48 is of a known type and it is mounted on the rear face of the front wall of the chassis, the spindle 35 projecting through an opening in the front wall. Once switched on by the knob the on-off switch 48 regulates the temperature of the heating element. As the supply cables 43 will be subject to some twisting during the working life of the grilling appliance owing to movement of the radiant surface between its stored and in-use positions they are multi-strand flexible cables and to withstand heat are covered with a suitable protective covering for example silicone rubber insulation. An indicator lamp 50 mounted in the front wall of the chassis is connected to the on-off switch and is arranged to glow when the supply to the heating element is switched "on."

A cover 51 is fitted over the top of the radiant surface, FIGURE 7, and in order that it and the heating element can be cleaned, or the element changed, it is made removable. It is arranged, however, that the cover 51 can only be removed when the radiant surface is not in the horizontal in-use position and therefore the knob 36 locked in the "off" position. The cover 51 is made of sheet metal and it is located in position on the frame of the radiant surface by lugs provided on the frame members which engage openings in the walls of the cover. A single centrally placed lug 52 is provided on the sheet metal strip 42 which engages an opening 53 through a rear wall of the cover and a lug 54 formed at the forward end of each side member engages an opening through the front corners of the cover. To remove the cover the radiant surface is moved outwards slightly from the vertical stored position in the supporting structure and the cover is first moved upwards to disengage the single lug 52 from the opening 53 then moved angularly to remove the released end from the radiant surface and finally moved downwards to disengage the two lugs 54. The portion of the cover adjacent the upper end of the supporting structure is shaped so that when the radiant surface is in the horizontal in-use position the cover bears against the underside of the top wall of the supporting structure so that while the radiant surface is locked in this position by the interlocking mechanism the cover cannot be moved angularly and thus cannot be removed.

I claim:

1. An electrically heated grilling appliance comprising: a radiant, including an electric heating element; a supporting structure on which said radiant is pivotally mounted about a horizontal axis and movable between a substantially horizontal position of use and a vertical stored position against said supporting structure; a manually operable bolt longitudinally slidably mounted on said supporting structure parallel to said horizontal axis; a keeper movable with the said heating element and defining an opening disposed so as to be enterable by said bolt when said radiant surface is in the position of use; a rotary electric switch mounted on said supporting structure controlling said heating element and having a rotary actuating spindle; a locking member rigid with said actuation spindle; a detent connected to, and for linear movement with said bolt; said locking member being disposed in relation to said detent as to obstruct said detent in attempted movement of said bolt out of engagement with said keeper except in the off position of said switch, said locking member having an aperture therein to receive said detent in the said off position of said switch and shaped so as to prevent rotary movement of said locking member when said detent is so received.

2. An electrically heated grilling appliance comprising: a radiant including an electric heating element; an upright supporting structure on which said radiant is pivotally mounted about a horizontal rotational axis and movable between a substantially horizontal position of use and a vertical stored position close against said supporting structure; a chassis mounted on said supporting structure adjacent one end of said radiant and having spaced end walls at right angles to the rotational axis of said radiant; aligned bearings in the end walls of said chassis and parallel to but spaced from the rotational axis of said radiant; a bolt slidable axially in said bearings; a keeper movable with said heating element and defining an opening disposed so as to be engageable by said bolt when said radiant is in the positon of use; a rotary electric switch mounted on said chassis and having a horizontal rotary actuating spindle at right angles to the vertical plane containing said rotational axis; a locking disc secured at right angles to said spindle and having a radial notch opening through its periphery and directed towards the grill and parallel to the rotational axis in the off position of the switch; an L-shaped member having first and second limbs and rigidly mounted on said bolt between said end walls; a manually operable knob outside said chassis and rigid with said first limb; and a detent rigid with said second limb and lying in the horizontal plane which contains said notch in the "off" position of said switch, said detent being obstructed by said locking disc so that said bolt cannot be withdrawn from said keeper except in the off position of said switch in which said detent can enter the notch, and the notch and detent being dimensioned so that when said detent is engaged in the notch said switch is prevented by their interengagement from being moved out of the "off" position.

3. An electrically heated grilling appliance as claimed in claim 2 wherein said radiant comprises a side member adjacent said chassis, the side member having a quadrant portion surrounding and at right angles to the pivotal axis and disposed so as to pass across said bolt end during pivotal movement of said radiant and obstructing sliding movement of said bolt out of its switch-locking position, there being in said quadrant a keeper opening aligned with said bolt in the position of use and dimensioned to receive and closely embrace said bolt so as to lock said radiant in the position of use.

4. An electrically heated grilling appliance comprising:
a supporting structure;
a radiant with an electric heating element foldably mounted on said supporting structure;
means for holding said radiant in the position of use;
an electric switch controlling said element;
interlocking means for holding said switch in the off position except when said radiant is in the position of use;
a detachable cover over said radiant, said cover having portions overhanging opposed edges of said radiant and spaced therefrom so as to permit limited lateral motion of said cover with respect to said radiant and means for preventing removal of said cover in the position of use including at least two projections rigid with said element and extending laterally from said opposed edges in directions away from one another;
openings in said overhanging portions, said projections engaging said openings, one of said projections being shorter and the other longer than said limited lateral motion of said cover;
and an abutment rigid with said supporting structure and engaged by said cover on the side opposite said radiant when said radiant is in the position of use, said cover being detachable from said radiant when said radiant is other than in the position of use by initial lateral movement of said cover in order to clear said shorter projection, swinging said cover away from said radiant about the said longer projection and lateral movement of said cover again in the direction opposite to the initial movement.

References Cited by the Examiner

UNITED STATES PATENTS

| | | | |
|---|---|---|---|
| 2,156,860 | 5/39 | Lucas et al. | 219—461 |
| 2,635,600 | 4/53 | Schulze | 126—214 |
| 2,685,637 | 8/54 | Oatley | 99—424 |
| 2,694,392 | 11/54 | Oatley | 126—41 |

RICHARD M. WOOD, *Primary Examiner.*

ANTHONY BARTIS, *Examiner.*